July 29, 1947.  W. R. P. DELANO  2,424,558
APPARATUS FOR HEAT SEALING
Filed Jan. 13, 1944

INVENTOR
WILLIAM R. P. DELANO
BY Worth Wade
ATTORNEY

Patented July 29, 1947

2,424,558

UNITED STATES PATENT OFFICE 2,424,558

APPARATUS FOR HEAT SEALING

William R. P. Delano, New York, N. Y., assignor, by mesne assignments, to American Viscose Corporation, Wilmington, Del., a corporation of Delaware Application January 13, 1944, Serial No. 518,119

4 Claims. (Cl. 154—42)

This invention relates in general to sealing, and in particular to a process and apparatus for heat-sealing thermoplastic sheet materials.

In the wrapping and packaging art there are a number of sheet materials which are formed of or coated with a thermoplastic material so that such sheet materials may be heat-sealed to each other or to other materials by the application of heat and pressure. When such thermoplastic sheet materials are heat-sealed, it is generally the case that the act of heat-sealing renders the sealed area dull and reduces the transparency. This is objectionable because the sealed areas then contrast with the smooth glossy unsealed areas.

In machines used for wrapping and heat-sealing such sheet materials, it has been found that the sheet tends to adhere to the heated metal sealing elements, thus interrupting the sealing operation. Moreover, direct contact of the thermoplastic sheeting to the heated sealing elements results in an accumulation of dirt, glycerine, excess coating material and the like, which forms sticky deposits on the metal surfaces. Occasionally thermoplastic sheet materials are sized or sprayed with an anti-sticking composition and this material also tends to accumuate on the heated metal surfaces of the machines. The accumulated dirt and material is undesirable because it increases the temperature necessary for proper sealing, decreases the speed of the machine, causes smudging, soiling, and scratching of the sheet material and promotes the corrosion of the metal surfaces.

It is a general object of the invention to prevent thermoplastic heat-sealable sheet material from adhering to the heated metal surfaces of heat-sealing elements.

It is a further object of the invention to provide means for prolonging the life and reduce the necessity for cleaning and polishing the heated sealing elements of automatic machinery for wrapping and packaging.

It is a more specific object to provide means for heat-sealing thermoplastic sheet materials without diminishing the surface gloss of the heat-sealed areas.

Other objects of the invention will in part be obvious and will in part appear hereinafter.

According to the present invention, the heated metal surfaces used in heat-sealing thermoplastic sheeting, are covered with a glossy non-thermoplastic film so that the metal surface does not make direct contact with the surface of the thermoplastic sheeting to be heat-sealed while a high gloss is imparted to the sealed areas. In one embodiment of the invention there is provided in a heat-sealing device, the combination of, heated metal surfaces covered with a glossy non-thermoplastic film. In a second embodiment of the invention there is provided, in a heat-sealing device, the combination of, means for passing a continuous glossy film of non-thermoplastic material between the heated metal surfaces and the thermoplastic sheeting, whereby sticking of the heated surfaces to the thermoplastic material is prevented and a gloss is imparted to the sealed areas.

According to the present process, thermoplastic sheet materials are heat-sealed to themselves or other materials by applying heat to such sheeting through a glossy film of a non-thermoplastic material, whereby the heated metal surfaces do not make direct contact with the thermoplastic sheeting.

It has been found, surprisingly enough, that a hydrophilic non-thermoplastic film, such as plasticized regenerated cellulose, will not adhere permanently to the surface of a sheet of thermoplastic material when the latter sheet undergoes heat-sealing. Any adhesion is purely temporary and the non-thermoplastic film may be readily stripped from the thermoplastic sheeting, whereupon it will be found that the smooth, glossy surface of the non-thermoplastic film has rendered the sealed area of the thermoplastic sheet smooth and glossy.

For a more complete understanding of the nature and objects of the invention, reference should be had to the accompanying drawing, in which.

Figure 1:
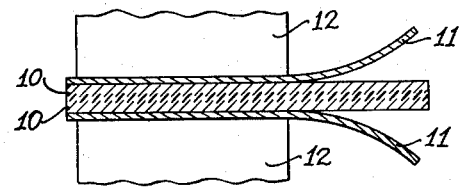
Fig. 1 is a side elevation in section of a segment of one embodiment of means for carrying out the process of the invention.

The thermoplastic sheeting which may be heat-sealed according to the present invention comprises thermoplastic synthetic resins as a class, thermoplastic cellulose derivatives as a class, thermoplastic synthetic rubbers as a class and sheet materials formed from mixtures of such thermoplastic materials. It is also to be understood that the sheet material which is to be heat-sealed may be composed entirely of such thermoplastic materials or it may be a non-thermoplastic material coated with a thermoplastic. Therefore, the invention is applicable for heat-sealing non-thermoplastic sheet materials having a coating on one or both surfaces of a thermoplastic material such, for example, as heat-sealing moistureproof plasticized regenerated cellulose, glassine and other papers having a thermoplastic coating and the like. The invention is especially adapted for heat-sealing thermoplastic sheet materials such, for example, as plasticized cellulose acetate, plasticized polyvinyl chloride, e. g. "Koroseal," halogenated rubber sheeting, e. g. "Pliofilm," cellulose actate-butyrate, and films formed of thermoplastic synthetic resins, such as a copolymer of vinyl chloride and vinyl acetate, e. g. "Vinylite" sheeting, polymerized esters of acrylic acid, polystyrene, vinylidine chloride and the like.

While the expression "sheeting" is used in describing the thermoplastic material, it is to be understood that this term includes pellicles and coated sheeting. The article to be sealed may have any physical form, that is, it may be a sheet, a film, a tubing, a band, a ribbon, and the like.

For the non-thermoplastic film which is used to prevent contact of the heated surfaces with the thermoplastic sheeting, there may be employed any non-thermoplastic organic plastic material such, for example, as films of unplasticized cellulose acetate (which is not thermoplastic), and films of gelatine, casein, regenerated cellulose (plasticized but uncoated), deacetylated chitin, as well as fibrous sheet materials, such as paper, fabrics and the like which have been coated with such non-thermoplastic hydrophilic materials or mixtures thereof. It is also possible to use a highly beaten, highly calendered glassine paper so long as it is substantially free of loose nap fibres. In the following specification and in the appended claims, the expression "glossy non-thermoplastic film" is intended to include such films or sheets formed in whole of or coated with a glossy non-thermoplastic material. The non-thermoplastic film employed is preferably non-fibrous and hydrophilic because such films show no tendency to adhere permanently to the heat-sealed thermoplastic material.

The non-thermoplastic film may be used as a loose slip sheet, or it may be fixed to the heating surface, or it may be passed concurrently with the thermoplastic sheeting through the heat-sealing device.

By way of illustrating the invention but not by way of limitation, there will be described several specific embodiments of means for carrying out the invention.

Referring to Fig. 1, there is shown two sheets 10 of a heat-sealable thermoplastic material enclosed between two glossy non-thermoplastic films 11. When the assembled sheets are subjected to pressure and heat applied by means of the sealing jaws 12, one or both of which may be heated, the heat is transmitted through the non-thermoplastic film, thus causing the thermoplastic sheets to adhere and form an autogenous weld. Thereafter, the members 12 are separated and the films 11 are peeled off the heat-sealed areas.

The device shown in Fig. 1 is of the type used in forming the bottom seal of bags and other flat containers. In a continuous bag-making machine, the two films 11 may be supplied to the sealing jaws 12 from continuous rolls in a known manner and cut from the web so as to leave a portion overhanging the edge of the bag, thus forming a tab which facilitates the stripping of the non-thermoplastic films from the heat-sealed areas.

Figure 2:
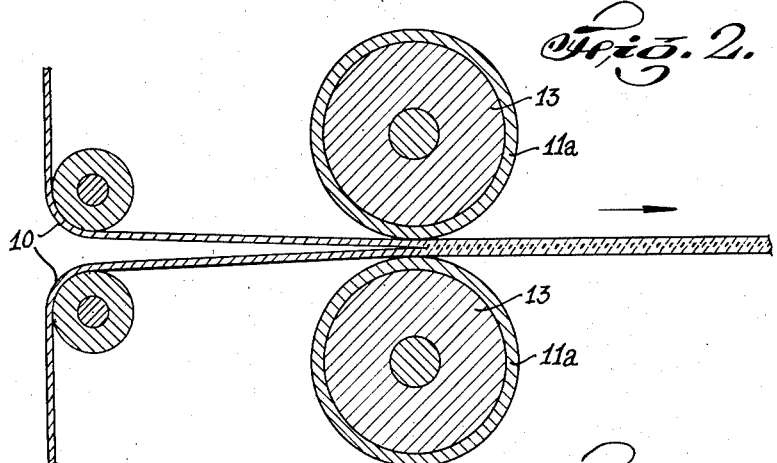
Fig. 2 is a side elevation in section of a second embodiment of the heat-sealing device of the invention.

In Fig. 2, there is shown a second embodiment of the sealing device, in which the heated sealing elements are rotatable rolls 13, one or both of which may be heated by conventional means (not shown), the rolls having a seamless tubular covering 11a formed of a non-thermoplastic film, for example a regenerated cellulose tubing. Such a covering may be readily applied to the rolls 13 by wetting the tubing and slipping it over the rolls and allowing it to shrink thereon during drying. The thermoplastic sheeting 10 may be fed through the covered rolls 13 and heat-sealed in a continuous manner, the tubular covering film 11a imparting gloss to the sealed areas. The device shown in Fig. 2 is especially adapted for use in sealing the longitudinal seam of wrapped packages and bags, in which case only one of the rolls 13 is heated. This device is also useful in laminating thermoplastic sheeting to itself or other materials. When one of the sheets 10 is non-thermoplastic, only that roller which contacts the thermoplastic sheet need be provided with a covering 11a.

Figure 3:
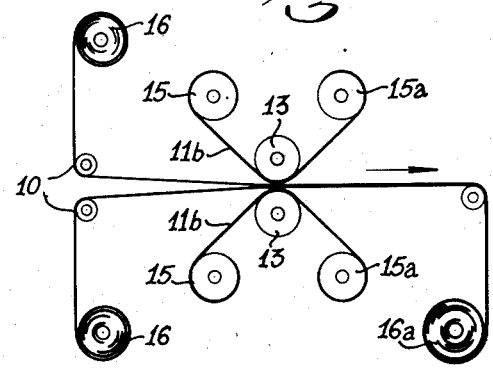
Fig. 3 is a diagrammatic view in side elevation of apparatus for continuous heat-sealing.

In Fig. 3, there is given a diagrammatical representation of an apparatus for sealing or laminating thermoplastic sheet materials in a continuous manner. This device differs from that of Fig. 2 only in the fact that, instead of using a tubular covering 11a, on one or both of the rolls 13, long webs 11b of glossy non-thermoplastic film material are passed through the nip of the rolls simultaneously with and on each side of the webs 10 of thermoplastic sheeting. The webs 11b are taken from rolls 15 and passed through the nip of the rolls 13; after which the webs 11b of non-thermoplastic film are peeled from the web 10 and rewound into the rolls 15a, while the webs 10 are taken from rolls 16 and the laminated product 10 wound up on a roll 16a.

Figure 4:
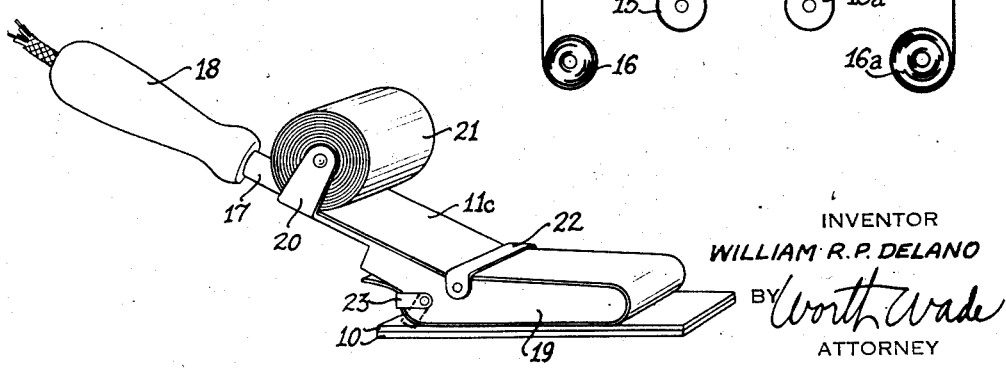
Fig. 4 is a perspective view in side elevation of a hand heat-sealing device embodying the invention.

It is to be understood that the process and apparatus of the invention is not limited to the use of automatic or continuous operating machines, but is equally applicable to manually operating devices. For example, there is shown in Fig. 4 a manual heat-sealer comprising a bar 17 having a handle 18 on one end and a flat sealing head 19 on the other, a bracket 20 on which is rotatably mounted a roll 21 of glossy non-thermoplastic film 11c which is fed under the retaining bar 22 and then under the sealing head 19 and clamped thereon by means of the pivoted bar 23. When the surface of the non-thermoplastic sheet which lies beneath the sealing head becomes abraded or rough from long use, the clamp 23 is moved to the position shown by the broken lines and a fresh section of the non-thermoplastic film 11c is fitted under the sealing head 19.

The process and apparatus of the invention are applicable to sealing, laminating, transferring, labeling, bag-making, wrapping, packaging and other operations requiring the uniting of thermoplastic sheeting to itself or other materials.

Since certain changes in carrying out the above process and in the construction set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. In an apparatus for heat-sealing thermoplastic sheeting to itself or to other materials, the combination of, a rotatable roller, means for heating said roller, and a seamless tubing of non-fibrous hydrophilic material fixed to the arcuate surface of said roller.

2. In an apparatus as recited in claim 1, in which said tubing is formed of regenerated cellulose and is shrunk on said roller.

3. In an apparatus for heat-sealing self-supporting thermoplastic sheeting to itself or other materials, the combination of a heat-sealing element and an uncoated film of nonfibrous hydrophilic material disposed over and affixed to the sealing surface of said heat-sealing element whereby said thermoplastic sheeting is heat-sealed through said film.

4. In an apparatus for heat-sealing self-supporting thermoplastic sheeting to itself or other materials, the combination of a heat-sealing element having an uncoated film of nonfibrous hydrophilic material disposed over and affixed to its sealing surface and means for heating said element, whereby said thermoplastic sheeting is heat-sealed through said film.

WILLIAM R. P. DELANO.

REFERENCES CITED

The following references are of record in the file of this patent:

UNITED STATES PATENTS

| Number | Name | Date |
| --- | --- | --- |
| 592,186 | Bedford et al. | Oct. 19, 1897 |
| 2,299,066 | Berger | Oct. 20, 1942 |
| 2,291,955 | Emmey | Aug. 4, 1942 |
| 2,253,946 | Waters | Aug. 26, 1941 |
| 2,289,618 | Young | July 14, 1942 |